United States Patent [19]

Hill

[11] Patent Number: 5,730,464
[45] Date of Patent: Mar. 24, 1998

[54] AIR BAG MODULE WITH TETHER

[75] Inventor: Timothy Wayne Hill, Troy, Mich.

[73] Assignee: General Motors Corporation, Detroit, Mich.

[21] Appl. No.: 514,360

[22] Filed: Aug. 11, 1995

[51] Int. Cl.[6] .................................................. B60R 21/16
[52] U.S. Cl. ............................ 280/743.2; 280/730.2
[58] Field of Search ....................... 280/743.1, 743.2, 280/728.1, 729, 730.2

[56] References Cited

U.S. PATENT DOCUMENTS

| | | | |
|---|---|---|---|
| 3,708,179 | 1/1973 | Hulten | 280/732 |
| 3,879,056 | 4/1975 | Kawashima et al. | 280/743.2 |
| 4,181,325 | 1/1980 | Barnett | 280/739 |
| 4,449,728 | 5/1984 | Pilatzki | 280/743.2 |
| 5,004,266 | 4/1991 | Miller et al. | 280/743.2 |

FOREIGN PATENT DOCUMENTS

| | | | |
|---|---|---|---|
| 9211423 U | 12/1992 | Germany . | |
| 2-37060 | 2/1990 | Japan | 280/743.2 |
| 4-201644 | 7/1992 | Japan | 280/743.2 |
| 4-292239 | 10/1992 | Japan | 280/743.2 |

OTHER PUBLICATIONS

Japanese Abstract—JP4292239–16 Oct. 1992—Air Bag for Vehicle—vol. 17 No. 99 (M–1373).
Japanese Abstract—JP4201644—22 Jul. 1992—Air Bag—vol. 16 No. 538 (M–1335).
Japanese Abstract—JP6227348—16 Aug. 1994—Side Air Bag Unit—vol. 18 No. 602 (M–1705).
Japanese Abstract—JP7069149—14 Mar. 1995—Air Bag Device for Assistant Driver's Seat.

*Primary Examiner*—Paul N. Dickson
*Attorney, Agent, or Firm*—Kathryn A. Marra

[57] ABSTRACT

An air bag module has an inflator for generating gas and an air bag deployable upon generation of gas by the inflator. The air bag includes an upper portion and a lower portion. The module also includes a tether being external to the air bag. The tether includes an upper end connected to the upper portion of the air bag and a lower end connected to the lower portion of the air bag. The tether is also located adjacent a vehicle occupant when the air bag is deployed. Upon air bag deployment, the occupant engages the tether and the tether pulls the air bag towards the occupant.

5 Claims, 3 Drawing Sheets

AIR BAG MODULE WITH TETHER

This invention relates to a vehicle air bag module, and more particularly to a module having a tethered air bag for protecting a vehicle occupant.

BACKGROUND OF THE INVENTION

It is well known in motor vehicles to provide an air bag module for protecting a vehicle occupant. It is also known to provide an air bag module including an air bag and an inflator for generating gas to inflate the air bag upon sensing predetermined vehicle conditions. It is also known to provide air bag modules for side impact protection of the vehicle occupant.

The prior art has disclosed side impact air bag modules which have either one air bag or a plurality of air bags which deploy to protect the head and torso portions of the vehicle occupant. These air bags have a contact surface for contacting the vehicle occupant and have an opposite reaction surface which must be supported by nearby vehicle structure such as the door, window, or pillar to prevent the occupant from pushing the air bag away. However, many times the support structure is not in a convenient location for air bag placement or the support structure, such as a window, is not always in place as a reaction surface during air bag deployment. In addition, many of the prior art air bag modules have the shortcoming of requiring multiple bags and multiple inflators for head and torso protection of the occupant.

SUMMARY OF THE INVENTION

This invention solves the shortcomings of the prior art by providing an air bag module having an air bag which does not require a reaction surface supported by vehicle structure to keep the occupant from pushing the air bag away. Instead, the air bag includes an external tether, adjacent the occupant, which is engaged by the occupant such that the air bag is pulled towards the vehicle occupant by the tether. Also advantageously, the torso of the occupant initially engages the tether and pulls the upper portion of the air bag towards the head of the occupant such that the head is caught by the air bag, thus shortening the distance that the head travels to reach the air bag.

These advantages are accomplished in a preferred form of the present invention by providing an air bag module having an inflator for generating gas and an air bag deployable upon generation of gas by the inflator. The air bag includes an upper portion and a lower portion. The module also includes a tether being external to the air bag. The tether includes an upper end connected to the upper portion of the air bag and a lower end connected to the lower portion of the air bag. The tether is also located adjacent a vehicle occupant when the air bag is deployed. Upon air bag deployment, the occupant engages the tether and the ends of the tether pull the air bag towards the occupant.

In accordance with another aspect of the invention, the air bag module is used for side impact protection of a vehicle occupant having a torso portion and a head portion. The upper portion of the air bag is for alignment with the head portion of the occupant and includes an uppermost edge. The lower portion of the air bag is for alignment with the torso portion of the occupant and includes a lowermost edge. The air bag has an air bag height defined between the uppermost edge and the lowermost edge. The tether has an upper end connected to the upper portion of the air bag, a lower end connected to the lower portion of the air bag, and a middle portion extending between the upper end and the lower end and being detached from the air bag. The tether has a tether height less than the air bag height. Upon air bag deployment, the torso portion of the occupant engages the middle portion of the tether and pushes the middle portion of the tether towards the air bag such that the upper end of the tether pulls the upper portion of the air bag towards the head portion of the occupant to advantageously catch the head portion of the occupant.

In accordance with further aspects of the invention, the tether preferably has a tether width approximately equal to the air bag width. Also, the upper portion of the air bag and the lower portion of the air bag are in fluid communication with each other so that inflator gas may be transferred therebetween. Preferably, the inflator is in fluid communication with the lower portion of the air bag such that when the occupant initially contacts the lower portion of the air bag, inflator gas is forced upwardly into the upper portion of the air bag. Also preferably, the air bag includes a bendable hinge portion located between the upper portion and the lower portion. Upon air bag deployment, the upper and lower ends of the tether pull the upper portion and the lower portion of the air bag towards each other and bend the air bag into a C-shape about the hinge portion. The hinge portion is preferably formed by sewing a seam partially across the width of the air bag between the upper portion and the lower portion.

BRIEF DESCRIPTION OF THE DRAWINGS

An embodiment of the present invention is described, by way of example only, with reference to the accompanying drawings in which.

DESCRIPTION OF THE PREFERRED EMBODIMENT

Figure 1:
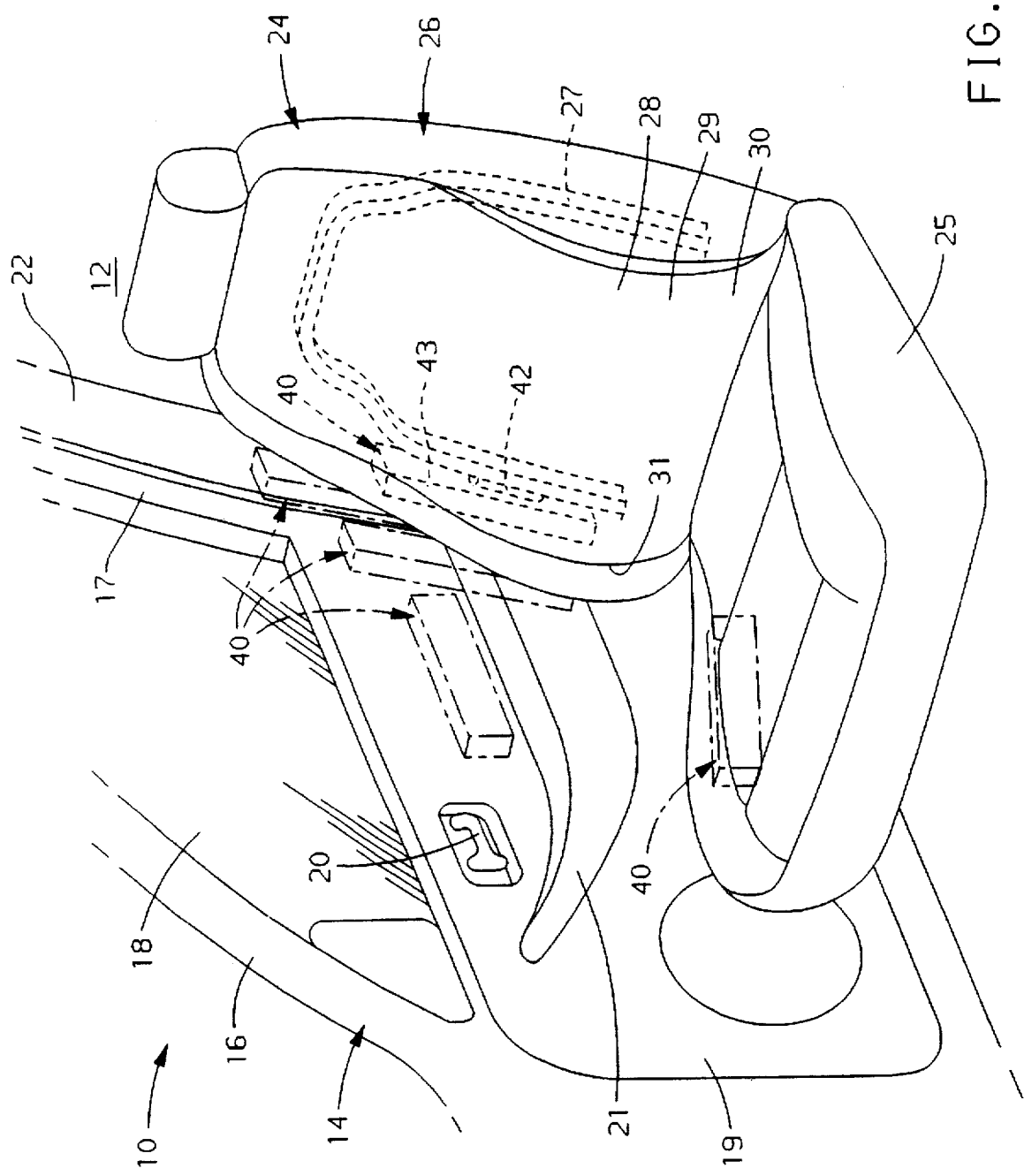
FIG. 1 is a perspective view of a vehicle interior partially broken away and including an air bag module in an undeployed condition located in a seat back and showing in phantom lines the air bag module alternately located in the seat bottom, vehicle door, and vehicle side pillar.

Referring to FIG. 1, it is seen that a vehicle 10 includes a vehicle interior 12 having a door 14 including a front side door pillar 16 and a rear side door pillar 17 and movable window 18 mounted therebetween. The door 14 also includes an inner door panel 19 mounting a door handle 20 and an armrest 21. The vehicle 10 further includes a vehicle side pillar 22 located behind the rear side door pillar 17.

The vehicle interior 12 further includes a seat 24 having a lower seat bottom 25 and an upper seat back 26. The upper seat back 26 includes a rigid seat frame rail 27, preferably being metal, and encompassed within a cushion portion 28 preferably formed of foam material (not shown) covered by fabric seat material 29 defining the contour of the outer surface 30 of the seat back 26. The fabric material 29 of the outer surface 30 of the seat back 26 includes a vertically extending frangible seat seam 31 proximate the inner door panel 19. A vehicle occupant 34 is seated in the vehicle seat 24 and is shown in a normal seating position in FIG. 2. The vehicle occupant 34 has an upper head portion 35 and a lower torso portion 36.

Referring to FIG. 1, an air bag module 40 according to the present invention is shown in the undeployed condition and is preferably mounted to the seat frame rail 27 of the seat back 26. It will also be appreciated that the air bag module 40 may alternately be mounted anywhere in the vehicle 10, but is especially well-adapted to also be mounted in various locations in the door 14, seat bottom 25, roof pillar (not shown), or vehicle side pillar 22, as best shown in phantom lines in FIG. 1, for side impact protection of the occupant 34.

The air bag module 40 includes the basic component parts of an inflator 42, an air bag 44, and a tether 70. The inflator 42 and folded air bag 44 are preferably stored in a housing 43 prior to air bag 44 deployment, as shown in FIG. 1. The housing 43 is preferably secured to the seat frame rail 27 or other suitable vehicle structure. The inflator 42 may be of any conventional construction which contains chemicals for igniting to generate gas for discharge upon the sensing of predetermined vehicle 10 conditions. The inflator 42 preferably includes ports (not shown) through which the inflator gas is discharged to inflate the air bag 44.

Figure 2:
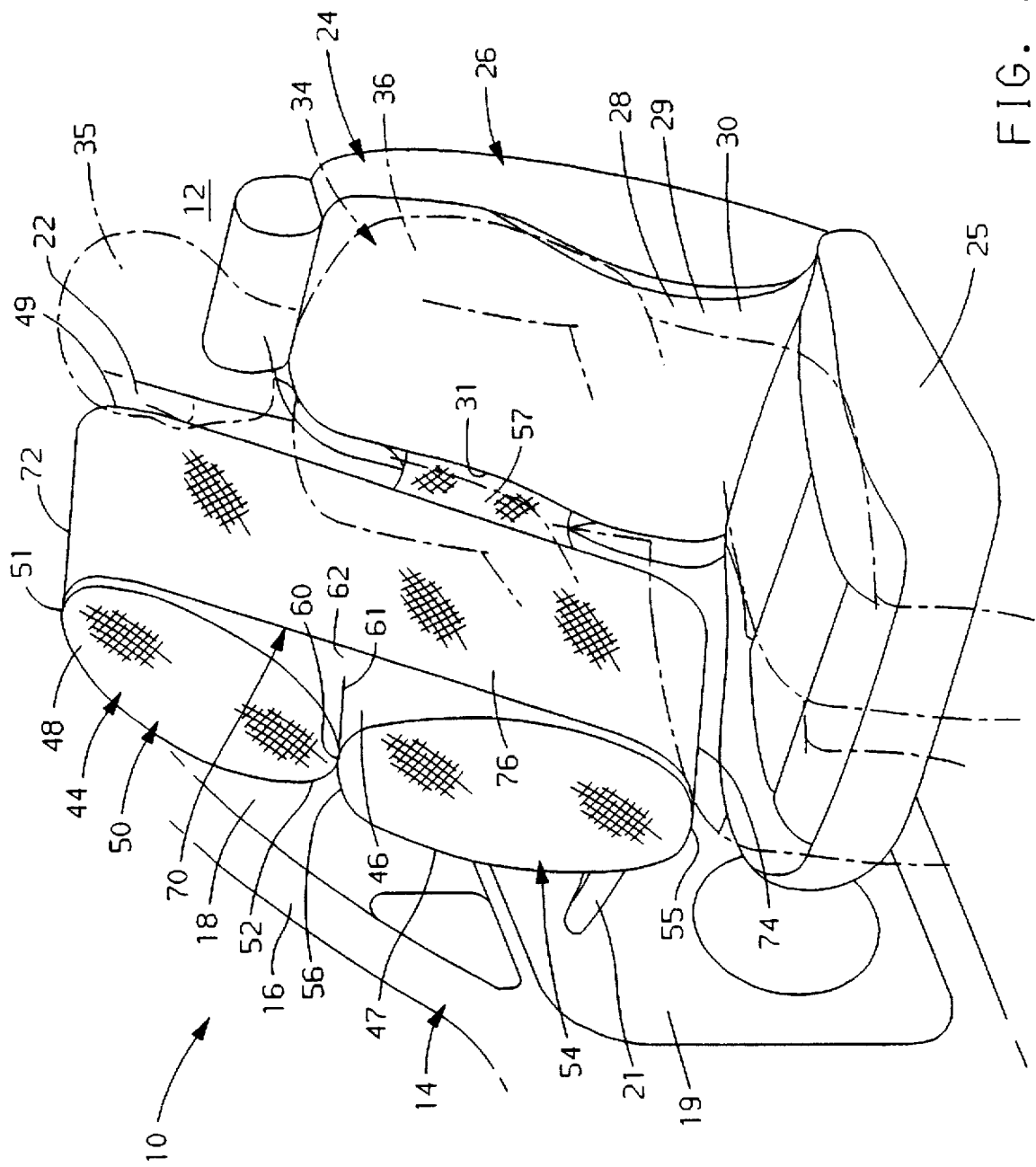
FIG. 2 is a view similar to FIG. 1, but showing the air bag module in the deployed condition revealing a deployed air bag and a tether and showing a vehicle occupant in the normal seating position.

As best shown in FIG. 2, the air bag 44 is preferably made of a fabric material which is suitable for air bag 44 construction. The air bag 44 includes a laterally inboard contact face 46 adjacent the vehicle occupant 34, an opposite laterally outboard face 47, and narrower front and rear side faces 48, 49. The air bag 44 includes an upper portion 50 for vertical alignment with the head portion 35 of the occupant 34 and a lower portion 54 for vertical alignment with the torso portion 36 of the occupant 34. The upper and lower portions 50, 54 of the air bag 44 are preferably integrally formed from the same sheet or sheets of fabric material and are in fluid communication with each other. The air bag 44 further includes an uppermost edge 51 located on the upper portion 50 and a lowermost edge 55 located on the lower portion 54. The air bag 44 has an air bag height defined between the uppermost edge 51 of the air bag 44 and the lowermost edge 55 of the air bag 44 when the air bag 44 is fully vertically extended (not shown). The air bag 44 further includes a lower edge 52 of the upper portion 50 and an upper edge 56 of the lower portion 54. The upper and lower portions 50, 54 of the air bag 44 are integrally joined and intersect at the lower edge 52 and upper edge 56 of the upper and lower portions 50, 54, respectively.

The location where the upper portion 50 and the lower portion 54 of the air bag 44 are joined preferably forms a hinge portion 60 about which the air bag 44 may bend. The upper portion 50, the lower portion 54, and the hinge portion 60 of the air bag 44 each preferably have the same longitudinally extending width. The hinge portion 60 is preferably formed by sewing longitudinally extending seams 61 partially across the intersection of the upper and lower portions 50, 54 of the air bag 44. The seams 61 are preferably sewn from the front and rear side faces 48, 49 of the air bag partially towards the center of the air bag 44 such that a central path 62 is left open through which inflator gas may be transferred between the upper and lower portions 50, 54 of the air bag 44. The lower portion 54 of the air bag 44 preferably includes a pocket-like mouth portion 57 which is in fluid communication with the inflator 42 such that inflator gas is initially discharged into the lower portion 54 of the air bag 44 and freely transferred into the upper portion 50 of the air bag 44 via the path 62, as described further hereinafter.

The tether 70 is preferably a continuous sheet of flexible, foldable fabric material and is preferably an integral continuation of the air bag 44 material. The tether 70 is located adjacent the vehicle occupant 34 and includes an upper end 72 attached to the uppermost edge 51 of the upper portion 50 of the air bag 44 and a lower end 74 attached to the lowermost edge 55 of the lower portion 54 of the air bag 44. The tether 70 also includes a middle portion 76 extending between the upper end 72 and the lower end 74 which is detached from the air bag 44. The tether 70 preferably has a fully extended vertical tether height which is less than the height of the air bag 44. The tether 70 preferably has a tether longitudinal width which is approximately equal to the longitudinal width of the air bag 44. The tether 70 is also located adjacent the contact face 46 of the air bag 44 such that the tether 70 is positioned between the vehicle occupant 34 and the contact face 46 of the air bag 44 when the air bag 44 is in the deployed condition as shown in FIG. 2.

Figure 3:
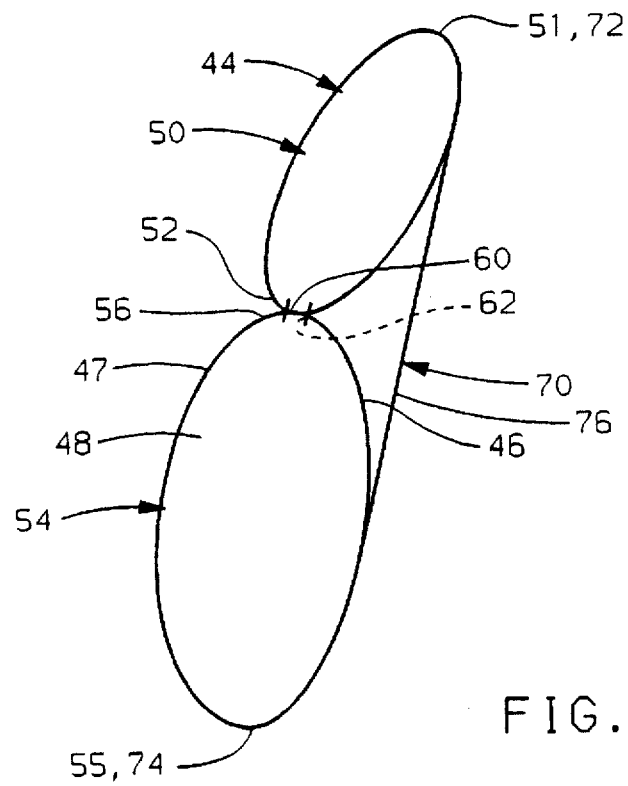
FIG. 3 is a schematic front view of the air bag and tether in the deployed condition.

Upon the vehicle 10 experiencing predetermined conditions, the inflator 42 generates inflator gas which is discharged into the mouth portion 57 of the air bag 44 and directly into the lower portion 54 of the air bag 44. The force of the deploying air bag 44 breaks out through the frangible seam 31 of the seat back 26 and the air bag 44 and attached tether 70 deploy in a forwardly direction next to the vehicle occupant 34. During deployment, inflator gas is freely transferable from the lower portion 54 of the air bag 44 into the upper portion 50 of the air bag 44 through the path 62 left open at the hinge portion 60 and not closed by the seams 61. Since the tether height is less than the air bag height, the uppermost and the lowermost edges 51, 55 of the air bag 44 are constrained by the upper and lower ends 72, 74 of the tether 70 and the inflated air bag 44 bends about the hinge portion 60 into a C-shape as best shown in FIGS. 2 and 3. Since the lower portion 54 of the air bag 44 is tied to the seat frame rail 27 by the mouth portion 57 of the air bag 44, the upper portion 50 of the air bag 44 is bent more laterally inboard by the tether 70 than the lower portion 54 of the air bag 44. It will further be appreciated that the degree of inboard lateral bending allowed by the air bag 44 may be controlled by the vertically extending connection of the rearward side face 49 of the air bag 44 with the seat frame rail 27, such as by the mouth portion 57. It will also be appreciated that varying the height of the tether 70 also controls the amount of bending of the air bag 44 which can be increased by shortening the height of the tether 70.

Figure 4:
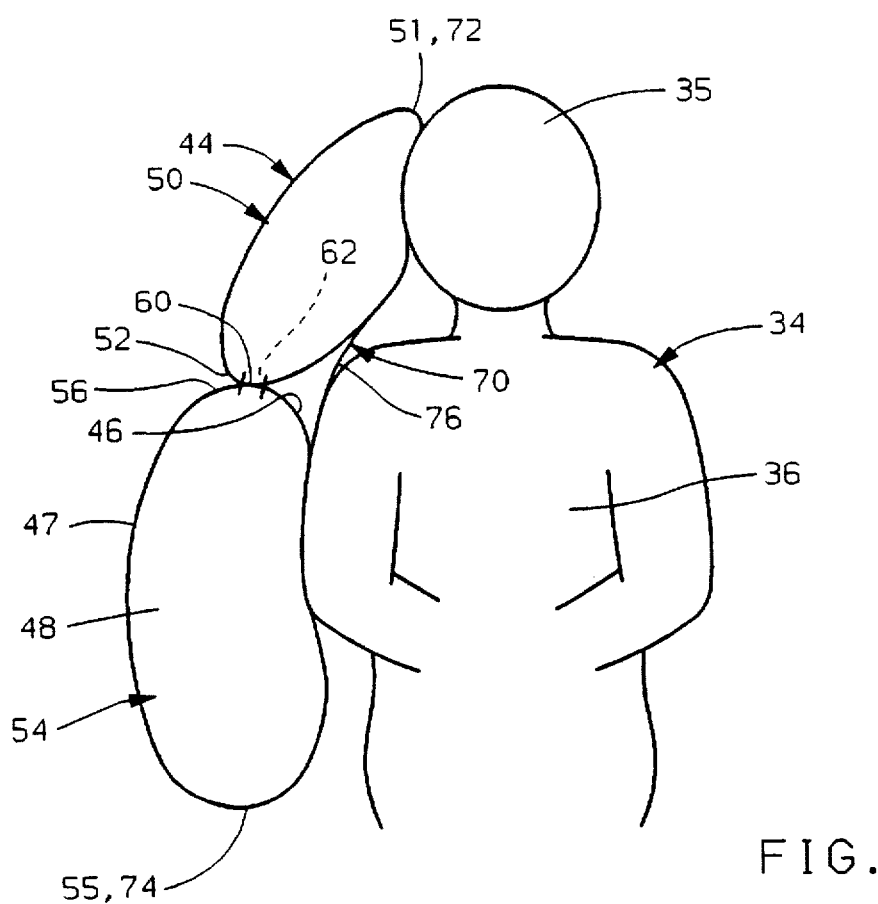
FIG. 4 is a schematic from view of the air bag and tether in the deployed condition and also showing engagement with the vehicle occupant.

When an occupant 34 is seated in the normal seating position during certain side impact events in which the air bag 44 is deployed, the occupant 34 moves towards the air bag 44 and the lower torso portion 36 of the occupant 34 initially engages the middle portion 76 of the tether 70 and the lower portion 54 of the air bag 44. As shown in FIG. 4, this occupant 34 engagement causes the upper end 72 of the tether 70 to pull the upper portion 50 of the air bag 44 downwardly and laterally inboard towards the head portion 35 of the occupant 34. Thus, the upper portion 50 of the air bag 44 catches the head portion 35 of the occupant 34. Also, the head portion 35 of the occupant 34 has a shorter distance to travel before reaching the upper portion 50 of the air bag 44. In addition, the occupant 34 interaction with the tether 70 pulls the entire air bag 44 laterally inboard towards the vehicle occupant 34, thus reducing the need for supportive vehicle structure adjacent the outboard face 47 of the air bag 44. The need for supportive vehicle structure or a reaction surface is eliminated for the upper portion 50 of the air bag 44 which is pulled and held downwardly and laterally inboard by the tether's 70 interaction with the torso portion 36 of the occupant 34. Thus, it does not matter whether the movable window 18 is in the up or down position during air bag deployment since a reaction surface is not needed to prevent the upper portion 50 of the air bag 44 from being pushed away from the head portion 35 of the occupant 34.

Also advantageously during air bag deployment, the inflator gas initially fills the lower portion 54 of the air bag 44 which is initially contacted by the occupant 34. The engagement of the occupant 34 with the lower portion 54 of the air bag 44 helps to distribute the inflator gas up through the path 62 in the hinge portion 60 and into the upper portion 50 of the air bag 44. Thus, only a single inflator 42 and single air bag 44 are required to provide side impact protection to both the head portion 35 and torso portion 36 of the occupant 34.

It will be understood that a person skilled in the art may make modifications to the preferred embodiment shown herein within the scope and intent of the claims. Although the preferred embodiment shows the air bag 44 and inflator 42 being housed within a housing 43 mounted to vehicle structure being the seat frame rail 27, it will further be appreciated that the housing 43 may be eliminated and the inflator 42 may be directly attached to the vehicle structure with the air bag 44 mounted directly to the inflator 42. It will also be appreciated that the air bag 44 may be folded and stored within the cushion portion 28 of the seat back 26 or within the seat bottom 25, the door 14, the roof rail, or the vehicle side pillar 27 prior to deployment with or without the housing 43. Although the preferred embodiment shows the air bag 44 deploying through a frangible seam 31 on the seat back 26, it will be appreciated that the air bag 44 may also deploy through a deployment door or any other openable covering.

Although the preferred embodiment shows the upper and lower ends 72, 74 of the tether 70 being attached to the uppermost and lowermost edges 51, 55 of the air bag 44, it will be appreciated that the upper end 72 of the tether 70 can be attached anywhere on the upper portion 50 of the air bag 44 and the lower end 74 of the tether 70 can be attached anywhere on the lower portion 54 of the air bag 44.

Although the preferred embodiment shows a single tether 70, it will be appreciated that more than one tether could also be used. It will further be appreciated that more than one hinge portion 60 could be provided in the air bag 44 such that the air bag 44 may bend about more than one hinge portion. For example, the lower portion 54 or upper portion 50 of the air bag 44 could be provided with additional hinge portions breaking each of the upper and lower portions 50,54 into several hinged segments. While the preferred embodiment shows the hinge portion 60 formed by sewing seams 61, other bonding or clamping methods may be used to form the appropriate hinge portions.

While the present invention has been described as carried out in a specific embodiment thereof, it is not intended to be limited thereby but is intended to cover the invention broadly within the scope and spirit of the claims.

The embodiments of the invention in which an exclusive property or privilege is claimed are defined as follows:

1. An air bag module for protecting a vehicle occupant comprising:

an inflator for generating inflator gas;

an air bag deployable upon generation of gas by the inflator, the air bag having an upper portion having an uppermost edge and a lower edge, the air bag having a lower portion having a lowermost edge and an upper edge, the lower edge of the upper portion of the air bag being connected to the upper edge of the lower portion of the air bag, the air bag having an air bag height defined between the uppermost edge and the lowermost edge;

a tether being external to the air bag and being positionable adjacent the vehicle occupant when the air bag is deployed, the tether having an upper end connected to the upper portion of the air bag and a lower end connected to the lower portion of the air bag, the tether having a tether height being less than the air bag height; and the air bag including a bendable hinge portion joining the upper portion to the lower portion; the hinge portion being formed by a seam sewn partially across the lower edge of the upper portion and the upper edge of the lower portion;

whereby upon air bag deployment the upper and lower ends of the tether pull the upper portion and the lower portion of the air bag towards each other and bend the air bag about the hinge portion.

2. An air bag module in a vehicle for side impact protection of a vehicle occupant having a torso portion and a head portion, the air bag module comprising:

an inflator for generating, inflator gas;

an air bag deployable upon generation of gas by the inflator, the air bag having an upper portion for alignment with the head portion of the occupant and having an uppermost edge, the air bag having a lower portion for alignment with the torso portion of the occupant and having a lowermost edge, the air bag having an air bag height defined between the uppermost edge and the lowermost edge, the air bag including a bendable hinge portion located between the upper portion and the lower portion;

a tether being external to the air bag and positionable adjacent the occupant when the air bag is deployed, the tether having an upper end connected to the upper portion of the air bag, a lower end connected to the lower portion of the air bag, and a middle portion extending between the upper end and the lower end and being detached from the air bag, the tether having a tether height less than the air bag height; and the air bag having an air bag width and the hinge portion being formed by a seam sewn partially across the width of the air bag between the upper portion and the lower portion;

whereby upon air bag deployment, the torso portion of the occupant engages the middle portion of the tether and pushes the middle portion of the tether towards the air bag whereby the upper end of the tether pulls the upper portion of the air bag towards the head portion of the occupant whereby the air bag is bent into a C-shape about the hinge portion.

3. An air bag module in a vehicle for side impact protection of a vehicle occupant having a torso portion including a shoulder portion, and a head portion, the air bag module comprising:

an inflator for generating inflator gas;

an air bag deployable upon generation of gas by the inflator, the air bag having an upper portion positionable laterally outboard of the head portion of the occupant, the air bag having a lower portion positionable laterally outboard of the torso portion of the occupant; the upper portion of the air bag being smaller than the lower portion of the air bag; and a tether being external to the air bag and positionable laterally outboard and adjacent the occupant when the air bag is deployed, the tether having an upper end connected to the upper portion of the air bag, a lower end connected to the lower portion of the air bag, and a middle portion extending between the upper end and the lower end and being detached from the air bag, the tether having a tether height less than the air bag height;

whereby upon air bag deployment, the torso portion of the occupant engages the middle portion of the tether and pushes the middle portion of the tether towards the air bag whereby the upper end of the tether pulls the upper portion of the air bag laterally inboard towards the head portion of the occupant such that the head portion is caught by the upper portion of the air bag.

4. An air bag module in a vehicle for side impact protection of a vehicle occupant having a torso portion including a shoulder portion, and a head portion, the air bag module comprising:

an inflator for generating inflator gas;

an air bag deployable upon generation of gas by the inflator, the air bag having an upper portion positionable laterally outboard of the head portion of the occupant, the air bag having a lower portion positionable laterally outboard of the torso portion of the occupant; the upper portion of the air bag being sized for engagement with the head portion of the occupant and the lower portion of the air bag being larger than the upper portion and sized for engagement with the torso portion of the occupant; and a tether being external to the air bag and positionable laterally outboard and adjacent the occupant when the air bag is deployed, the tether having an upper end connected to the upper portion of the air bag, a lower end connected to the lower portion of the air bag, and a middle portion extending between the upper end and the lower end and being detached from the air bag, the tether having a tether height less than the air bag height;

whereby upon air bag deployment, the torso portion of the occupant engages the middle portion of the tether and pushes the middle portion of the tether towards the air bag whereby the upper end of the tether pulls the upper portion of the air bag laterally inboard towards the head portion of the occupant such that the head portion is caught by the upper portion of the air bag.

5. An air bag module in a vehicle for side impact protection of a vehicle occupant having a torso portion including a shoulder portion, and a head portion, the air bag module comprising;

an inflator for generating inflator gas;

an air bag deployable upon generation of gas by the inflator, the air bag having an upper portion positionable laterally outboard of the head portion of the occupant, the air bag having a lower portion positionable laterally outboard of the torso portion of the occupant; and a tether being external to the air bag and positionable laterally outboard and adjacent the occupant when the air bag is deployed, the tether having an upper end connected to the upper portion of the air bag, a lower end connected to the lower portion of the air bag, and a middle portion extending between the upper end and the lower end and being detached from the air bag, the tether having a tether height less than the air bag height;

whereby upon air bag deployment, the torso portion of the occupant engages the middle portion of the tether and pushes the middle portion of the tether towards the air bag whereby the upper end of the tether pulls the upper portion of the air bag laterally inboard towards the head portion of the occupant such that the head portion is caught by the upper portion of the air bag; and the air bag including an uppermost end on the upper portion of the air bag and a lowermost end on the lower portion of the air bag and the air bag including a bendable hinge portion located between the upper portion and the lower portion, the hinge portion being positionable laterally outboard of the middle portion of the tether and laterally outboard of the shoulder portion of the occupant when the air bag is deployed, and wherein the hinge portion is located closer to the uppermost end of the air bag than to the lowermost end of the air bag whereby upon air bag deployment the shoulder portion of the occupant engages the middle portion of the tether and pushes the middle portion of the tether towards the hinge portion such that the upper end of the tether pulls the upper portion of the air bag laterally inboard towards the head portion of the occupant for catching the head portion.

* * * * *